(12) United States Patent
Chen et al.

(10) Patent No.: US 7,362,905 B2
(45) Date of Patent: Apr. 22, 2008

(54) METHODS AND SYSTEMS FOR DV ENCODING AND DECODING

(75) Inventors: Hong-Hui Chen, Hsinchuang (TW); Chung-Yen Lu, Taipei (TW); Chi-Hui Huang, Taipei (TW)

(73) Assignee: Mediatek Inc., Hsin-chu (TW)

(*) Notice: Subject to any disclaimer, the term of this patent is extended or adjusted under 35 U.S.C. 154(b) by 681 days.

(21) Appl. No.: 10/930,875

(22) Filed: Aug. 31, 2004

(65) Prior Publication Data

US 2006/0045359 A1    Mar. 2, 2006

(51) Int. Cl.
*G06K 9/36* (2006.01)

(52) U.S. Cl. ...................................... 382/232

(58) Field of Classification Search ........ 382/232–234, 382/236, 238, 244–253; 348/394.1–395.1, 348/400.1–404.1, 407.1–416.1, 419.1–420.1, 348/430.1–431.1, 473, 722; 375/240.04, 375/240.06, 240.11, 240.12, 240.18, 240.23, 375/240.24, 240.25
See application file for complete search history.

(56) References Cited

U.S. PATENT DOCUMENTS

| | | | | |
|---|---|---|---|---|
| 5,283,646 | A * | 2/1994 | Bruder | 375/240.12 |
| 5,684,714 | A * | 11/1997 | Yogeshwar et al. | 370/521 |
| 5,740,283 | A * | 4/1998 | Meeker | 382/248 |
| 5,801,779 | A | 9/1998 | Uz et al. | |
| 5,903,673 | A * | 5/1999 | Wang et al. | 382/236 |
| 6,480,541 | B1 * | 11/2002 | Girod et al. | 375/240.12 |
| 6,553,150 | B1 * | 4/2003 | Wee et al. | 382/243 |
| 6,717,535 | B2 * | 4/2004 | Furuta | 341/67 |
| 6,744,816 | B1 | 6/2004 | Park et al. | |
| 6,754,274 | B2 | 6/2004 | Park | |

OTHER PUBLICATIONS

China Office Action mailed Aug. 24, 2007.

* cited by examiner

*Primary Examiner*—Jose L. Couso
(74) *Attorney, Agent, or Firm*—Thomas, Kayden, Horstemeyer & Risley

(57) ABSTRACT

Methods and systems for multi-stage DV encoding and decoding. A skip command may be issued by a microprocessor or DRAM controller via a physical link when DRAM bandwidth is overtaxed. Corresponding encoding and decoding systems implementing the proposed DV encoding or decoding method are also provided.

44 Claims, 11 Drawing Sheets

METHODS AND SYSTEMS FOR DV ENCODING AND DECODING

BACKGROUND

The invention relates to digital video (DV), and more specifically, to methods and systems for DV encoding and decoding.

Digital video (DV) has became a popular technology, and as with most developing technologies, products thereof are now affordable to average consumers. DV markets have expanded exponentially, and digital cameras are one of the most popular products. One inherent impasse of the digital camera is conversion and reconversion of a mass amount of video data that represents the recorded digital images to a computer system such that the user of the computer system can manipulate, transfer, or store the digital images. The process of transferring video data into a digital format for online distribution or recording to disc is called encoding, and the recovery operation decoding. Sophisticated encoding techniques have been developed to encode and compress digital information into ever smaller space for convenience. Common digital image encoding techniques include JPEG, MPEG, and DV encoding technique. DV encoding is a more efficient method since it generates variable length coding (VLC) to encode as much data into as little space as possible without losing detailed information.

Variable length coding (VLC) distributes coded data throughout a fixed encoded data structure. In the context of the DV specification, a PAL system employs a video frame containing 1620 macro blocks, whereas an NTSC system employs a video frame containing 1350 macro blocks. Each macro block comprises four luminance (Y) discrete cosine transformation (DCT) blocks, and two chrominance (Cr and Cb) DCT blocks. The total picture elements in a video frame are divided into 60 super blocks for PAL, and 50 super blocks for NTSC. Each super block consists of 27 macro blocks. Furthermore, a video segment comprises 5 macro blocks from various areas within the video frame. The macro blocks in the video frame are shuffled by forming video segments. On average, each macro block is compressed from 384 to 77 bytes. This shuffling process averages out the frequency characteristics of the data and hence reduces the degree of difficulty of compression.

Three well known DV formats, MiniDV, DVCAM, and DVCPRO all utilize DV encoding (or DV compression). The compression ratio is 5:1, and the data rate is fixed at 25 Mbps, such that DV compression is consistent and file size does not vary as a file is recorded or played back. DV compression uses intraframe discrete cosine transform (DCT) compression to reduce the size of the file being recorded. Each individual frame is compressed and there is no reliance on adjacent frames for color or other data. FIG. 1 depicts a simplified system block diagram for DV encoding. DV data retrieved from a storage module/device 12 is first analyzed by the DCT algorithm 13 and converted to frequency domain coefficients. The converted data is then provided to perform weighting (W) 14, wherein the direct current (DC) component is lightly shifted, and high frequency components are scaled to be less significant, since the human eye is less sensitive to high frequency components. After weighting, the data is provided to perform quantization (Q) 15 and scanning 16. The high frequency zones of the quantized data contain long runs of zeros, and the quantized data is read in specific order in the scan module 16. Next, the data passes a run-length coding (RLC) module 17 and a variable length coding (VLC) module 18. The VLC module 18 implements a multi-stage encoding scheme.

FIG. 2 is a flowchart illustrating 3-stage (or 3-pass) VLC encoding, during which the variable length coded data is filled in a video segment with a constant size and predefined data format. As previously described, each video segment comprises 5 macro blocks, and each macro block comprises 6 DCT blocks (4 luminance blocks and 2 chrominance blocks). As shown in FIG. 3a, the data is entered in each corresponding DCT block 311~316 of a macro block 31 at the pass 1 encoding stage, where the shaded area illustrates the amount of data filled in each DCT block 311~316. For example, there is excess data for the DCT block 311, as well as insufficient data for the DCT blocks 314, 315, and 316. The excess data is temporarily stored in a buffer (identified by numeral reference 11 in FIG. 1), such as static random access memory (SRAM). At the pass 2 encoding stage, the excess data of a DCT block can be entered in any unfilled DCT block within the same macro block. As shown in FIG. 3b, the excess data of the DCT block 311 is entered in the DCT block 314. At the pass 3 encoding stage, any excess data that cannot find space within the same macro block during pass 2 encoding stage can search for space in other macro blocks within the same video segment. As shown in FIG. 3c, a video segment 3 contains 5 macro blocks 31~35, allowing excess data of the macro block 33 to be entered in the macro block 31 at the pass 3 encoding stage.

FIG. 4 is a simplified block diagram of DV decoding. The DV decoding system executes the inverse process to DV encoding. Encoded DV data retrieved from a storage means 41 is provided to a variable length decoding (VLD) module 42 and a run-length decoding (RLD) module 43. The decoded data is then passed to an inverse scan (ISCAN) module 44, inverse quantization (IQ) module 45, inverse weighting (IW) module 46, and an inverse DCT (IDCT) module 47.

The VLD decoding procedure performed in the VLD module 42 is illustrated by the flowchart of FIG. 5. The VLD module 42 can also perform a 3-stage (or 3-pass) decoding process, similar to the VLC encoding process discussed. The encoded DV data can be correctly decoded from each segment by executing pass 1, pass 2, and pass 3 decoding accordingly.

SUMMARY

In an embodiment of the invention, an encoding method for a DV encoder acquires DV data, skipping a next or remaining pass encoding stage(s) if necessary. In the 3-stage (or 3-pass) encoding process, where the bandwidth of shared DRAM is carefully monitored, a skip command can be issued by a microprocessor, a dynamic random access memory (DRAM) controller via a physical link. To inform the DV encoder of shared resource insufficiency, in mode 0, the status of the DRAM controller is monitored by or reported to the microprocessor, and the microprocessor issues a skip command if the system resources of the DRAM are occupied, for example, when the DRAM bandwidth utilized by the system exceeds a critical level. Mode 1 further reduces loading on the microprocessor, wherein a physical link exists between the DRAM controller and the DV encoder for reporting of DRAM bandwidth status by passing a skip command. The microprocessor issues a skip command when detecting a fast forward or fast rewind operation in an external DV device connected to the system via a 1394 port. If the DV data is encoded into Internet streaming, a skip command may be issued to the DV encoder when an expected channel error rate exceeds a predetermined value.

In an embodiment of the invention, an encoding system comprises a DV encoder, a microprocessor, a DRAM, and a DRAM controller. The DV encoder includes a buffer, a variable length coding (VLC) device, and a control mechanism. The buffer temporarily stores the data required for DV encoding, and the VLC device acquires the data from the buffer for multi-stage encoding. The control mechanism drives the VLC device to skip the next or remaining pass encoding stage(s) and commands the buffer to provide a subsequent video segment to the VLC device when receiving a skip command. Operation of the DV encoder can be in any of the described modes, such that the skip command can be issued by the microprocessor or the DRAM controller via a physical link when resources of the DRAM are overtaxed. The encoding system further comprises a 1394 port, which connects to an external DV device. The microprocessor may issue a skip command when detecting the external DV device operation in fast forward or fast rewind. If the DV data is transmitted to an error-prone environment, such as the Internet, a skip command is issued to the DV encoder when a channel error rate exceeds a predetermined value. The DV encoder further comprises a transformation device analyzing the data using a discrete cosine transformation (DCT) algorithm, a quantization device weighting and quantizing the output of the transformation device, a scan device scanning the output of the quantization device, and a run-length coding (RLC) device performing RLC encoding for output, finally providing the RLC encoded data to the VLC device.

The corresponding decoding method for a DV decoder according to an embodiment of the invention comprises acquiring the DV data for a multi-stage decoding process, and skipping the next or remaining pass decoding stage(s) when receiving a skip command. A multi-stage decoding process corresponds to the 3-pass encoding process at the DV encoder end. Similar to the encoding method, the skip command can be issued by a microprocessor, or a DRAM controller via a physical link, with DRAM bandwidth assumed to be the critical shared resource. In mode 0, the status of the DRAM controller is monitored by or reported to the microprocessor, and the microprocessor issues a skip command if the system resources of the DRAM are occupied. Mode 1 further reduces loading on the microprocessor, wherein a physical link between the DRAM controller and the DV decoder informs the DV decoder of DRAM bandwidth status by passing a skip command to the DV decoder. The microcontroller issues a skip command when detecting a fast forward or fast rewind operation in an external DV device connected to the DV decoder via the 1394 port. If the DV data is transmitted by Internet streaming, a skip command may be issued to the DV decoder when a channel error rate exceeds a predetermined value.

The corresponding decoding system comprises a DV decoder, a microprocessor, a DRAM, and a DRAM controller. The DV decoder includes a storage means, a variable length decoding (VLD) device, and a control mechanism. The storage means stores data required for DV decoding, and the VLD device acquires the data from the storage means for execution of multi-stage decoding. When receiving a skip command, the control mechanism drives the VLD device to skip the next or remaining pass decoding stage(s), and commands the storage means to provide a subsequent video segment to the VLD device for the pass not skipped. The operation of the DV decoder can be in one of two modes, such that the skip command is issued by the microprocessor or the DRAM controller via a physical link when resources of the DRAM are overtaxed. The skip command can also be issued when an external DV device on a 1394 port is fast forwarding or fast rewinding the video. If the DV data originates in an error-prone environment, such as the Internet with narrow bandwidth, a skip command is issued to the DV decoder when a channel error rate exceeds a predetermined value. The DV decoder further comprises a run-length decoding (RLD) device performing RLD decoding for the output of the VLD device, an inverse scan device, an inverse quantization device, and an inverse transformation device. Each device corresponds to a device in the DV encoder, and performs the inverse operation of DV encoding.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

In a system on chip (SOC) design, many functional blocks share storage and computation resources, such as dynamic random access memory (DRAM) and central processing unit (CPU). If the shared resource is insufficient to complete a certain operation inside a functional block, the computation result will be incorrect, causing abnormal output that is hardly tolerable in a consumer-oriented design. A compromise scheme is provided to reduce the risk of failures due to insufficient shared resources.

Figure 2:
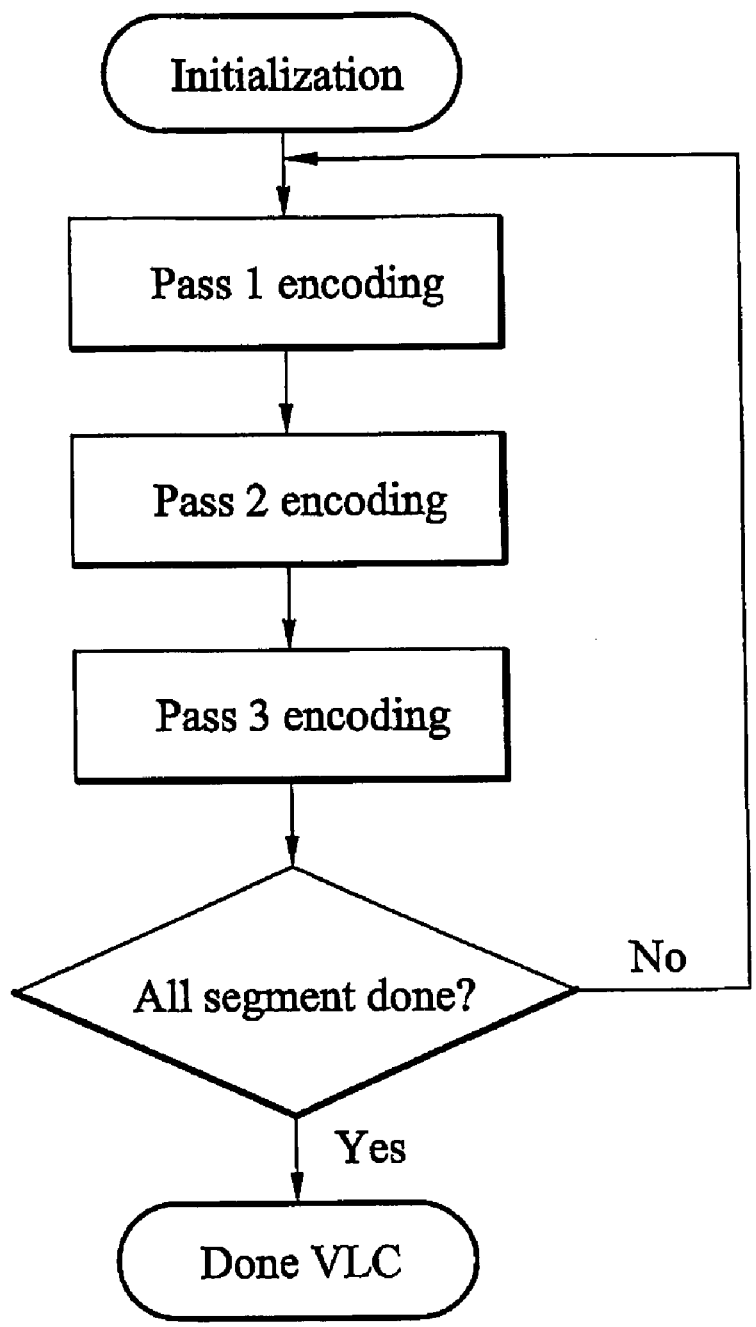
FIG. 2 is a flowchart illustrating variable length coding (VLC) DV encoding.
Figure 3A:
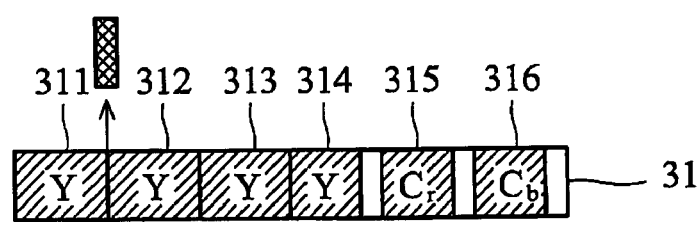
FIGS. 3a~3c illustrate a 3-pass encoding process for a video segment.
Figure 3B:
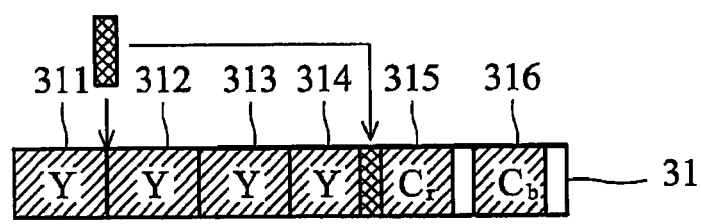
Figure 3C:
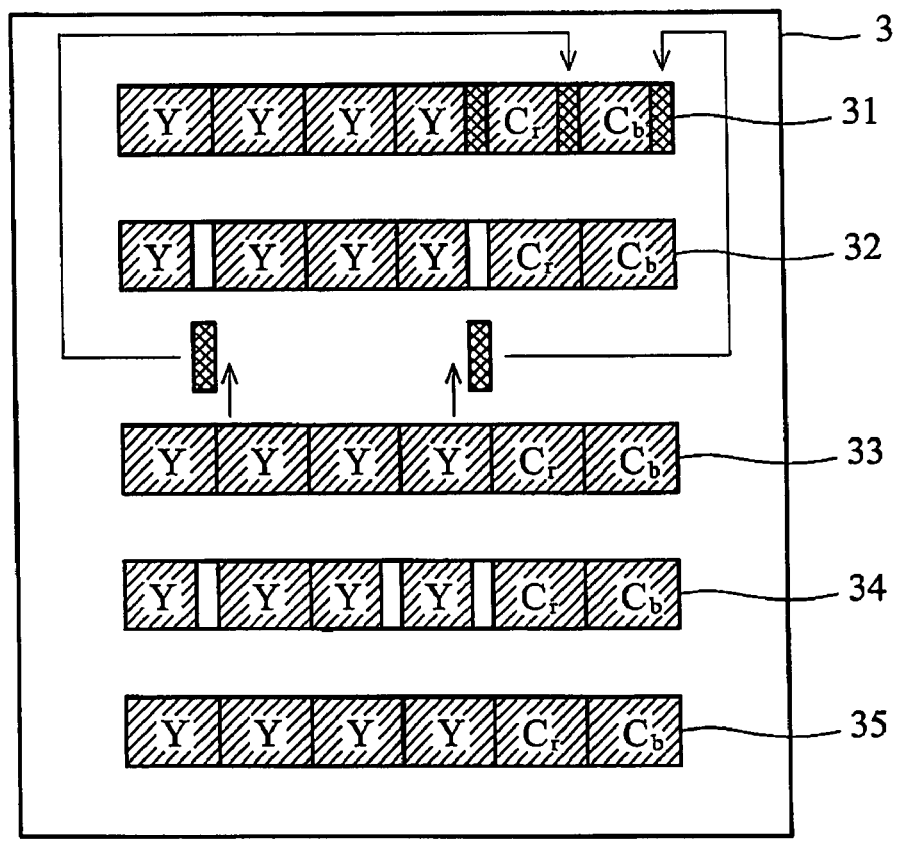
Figure 5:
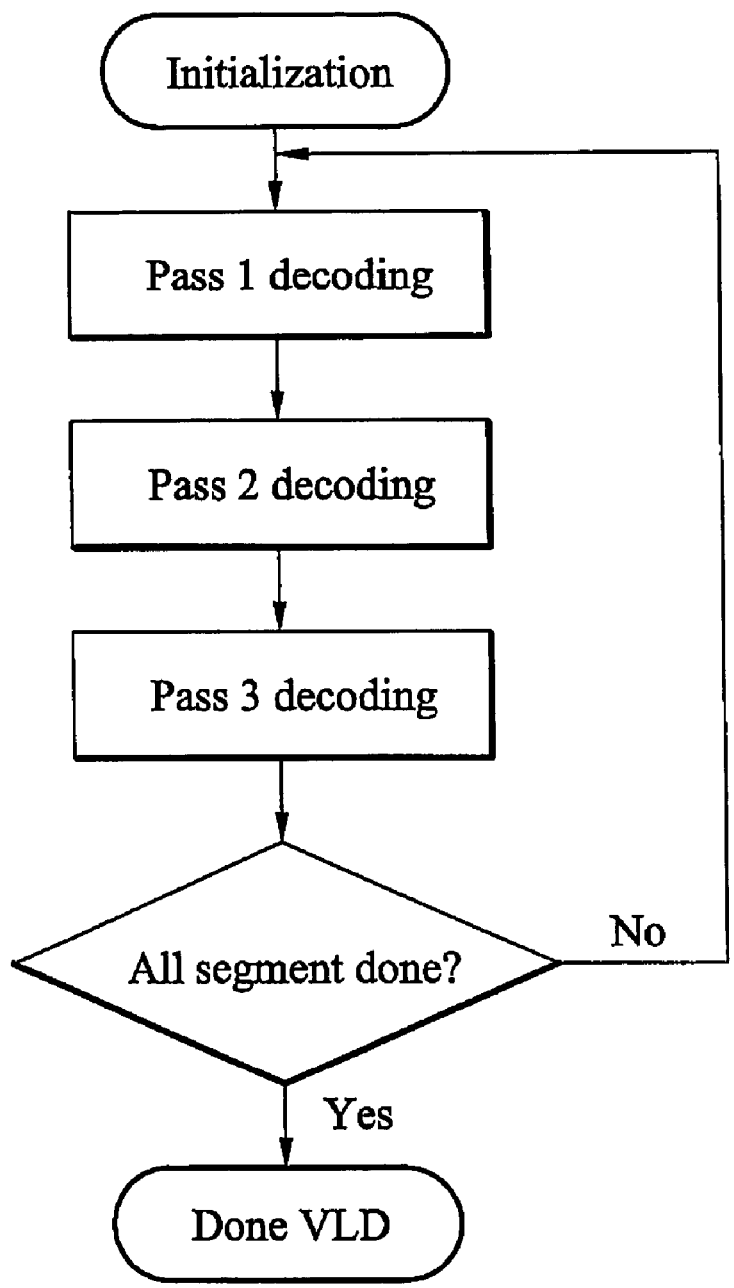
FIG. 5 is a flowchart illustrating variable length decoding (VLD) DV decoding.

As shown in FIGS. 2 and 5, the DV encoding or decoding algorithm is a 3-stage (or 3-pass) encoding/decoding process. If the header of a video segment is correctly maintained, truncation of other VLC data generated by the 3-pass encoding/decoding process in the video segment will still produce valid encoded/decoded bit stream. In other words, in VLC encoding or VLD decoding, the DV data is still valid if any one or more subsequent encoding/decoding stage is omitted. The DV data is valid for the remaining DV processing even if all three encoding/decoding stages (pass 1, pass 2, and pass 3 stages) are omitted. The proposed DV encoding and decoding methods utilize this specific characteristic of DV data to alleviate the shared resource overloads, such as problems caused by DRAM bandwidth shortage.

Figure 6:
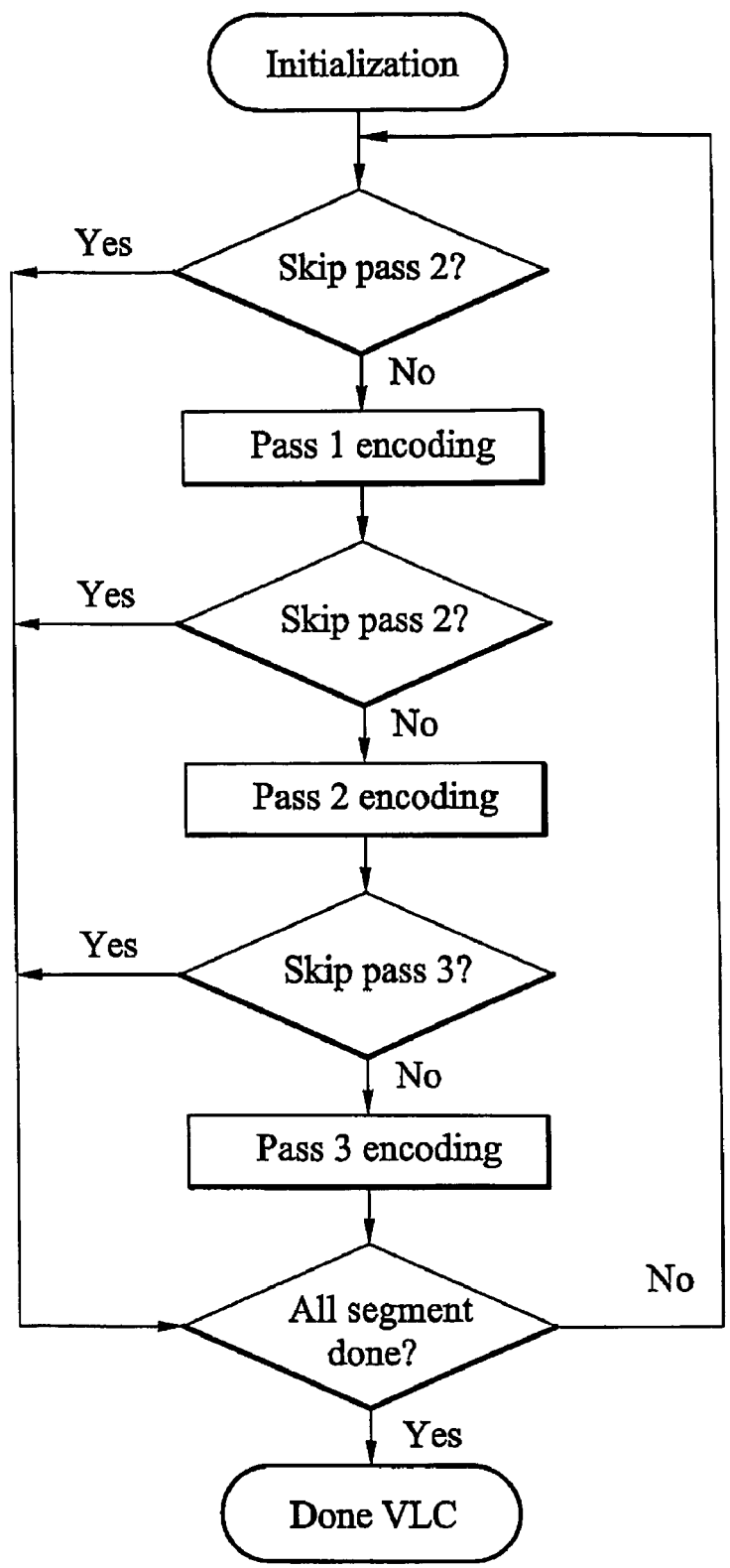
FIG. 6 is a flowchart illustrating modified VLC encoding according to an embodiment of the invention.

FIG. 6 is a flowchart showing an embodiment of VLC encoding. Compared to the flowchart shown in FIG. 2, there is an additional decision block before each encoding stage in FIG. 6. The encoding procedure of a video segment may be interrupted and subsequent passes may be skipped if the answer to any of the additional decision blocks is "yes", indicating a skip command received by the DV encoder. For example, pass 3 encoding is skipped if a skip command occurs while performing pass 2 encoding, whereas pass 2 and pass 3 encoding are skipped if a skip command occurs while performing pass 1 encoding. If a skip command is received before pass 1 encoding, all three passes are omitted. In normal conditions without any skip command, the encoding process is (pass1, pass2, pass3), (pass1, pass2, pass3), (pass1, pass2, pass3), and so on. The encoding process may become any combination of full encoding, that is (pass1, pass2, pass3), and possible incomplete encoding, for examples, (pass1, pass2), (pass1), and (none, only process the header).

Figure 1:
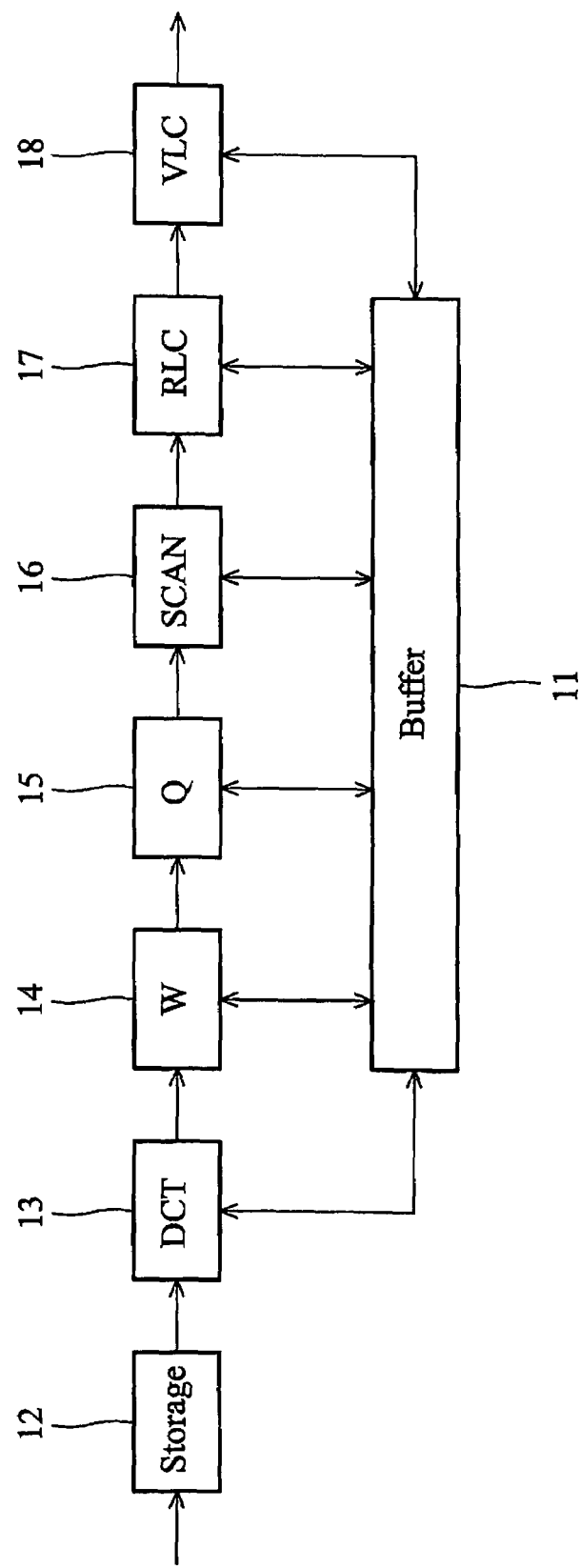
FIG. 1 is a block diagram illustrating a DV encoder.
Figure 7:
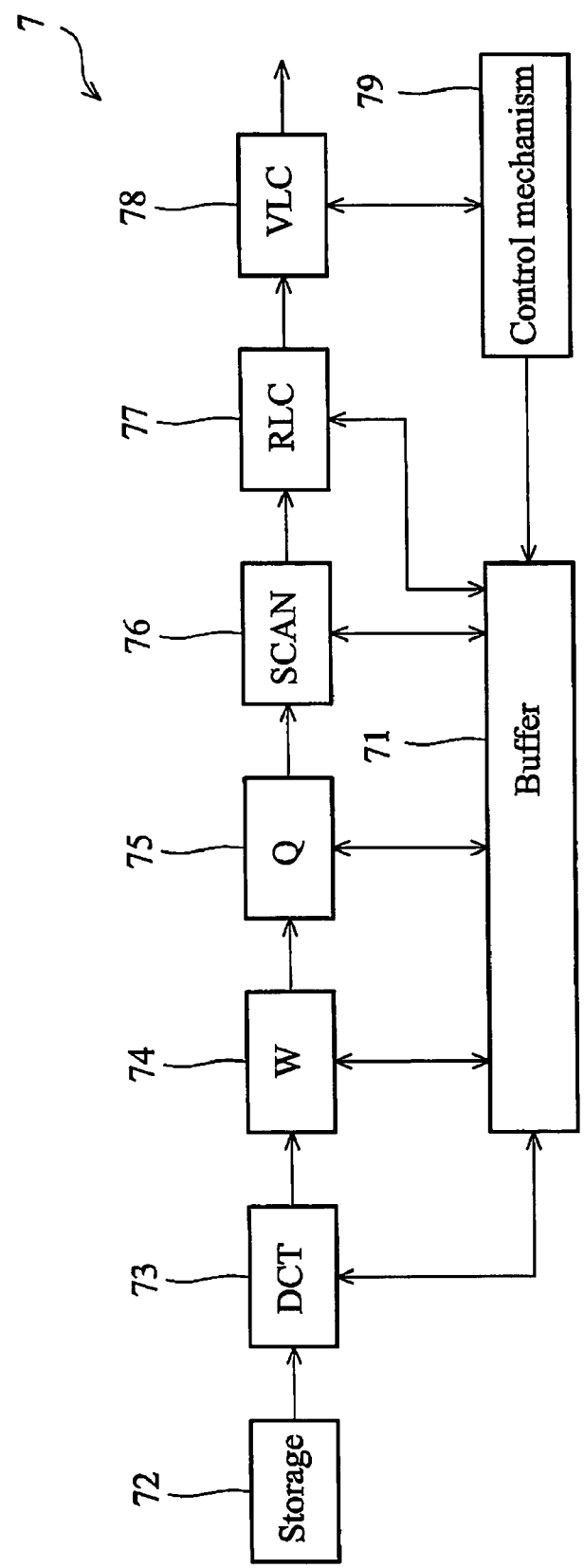
FIG. 7 is a block diagram illustrating an exemplary DV encoder of an embodiment of the invention.

FIG. 7 is a block diagram illustrating an embodiment of a DV encoder 7. A control mechanism 79 controls a VLC device 78 and a buffer 71 according to specific system information. Storage device 72, DCT device 73, weighting device 74, quantization device 75, scanning device 76, and RLC device 77 are all identical to the corresponding devices shown in FIG. 1. The control mechanism 79 issues a skip command to the VLC device 78 when receiving specific system information, and it also requests the buffer 71 to provide a next video segment to the VLC device 79 for encoding. The specific system information invoking the control mechanism 79 to issue a skip command may include fast forward/fast rewind operation, error-prone environment, or system resource (e.g. computation/bandwidth of a shared device) shortage.

Figure 8:
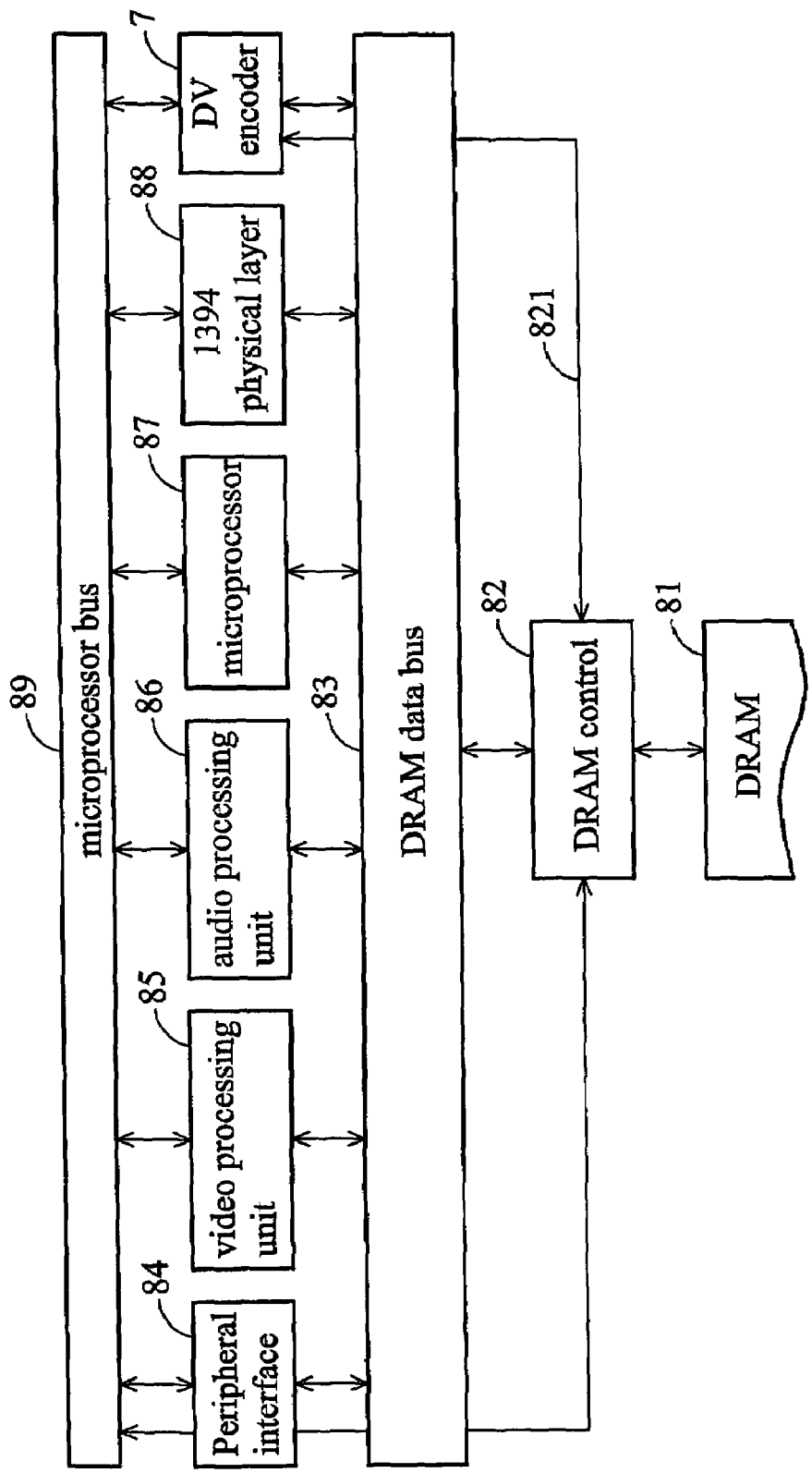
FIG. 8 depicts a DV encoding system according to an embodiment of the invention.

FIG. 8 depicts a DV encoding system including the exemplary DV encoder 7. The DV encoding system further comprises a dynamic random access memory (DRAM) 81, a DRAM controller 82, a peripheral interface 84, a video processing unit 85, an audio processing unit 86, a microprocessor 87, and a 1394 physical layer 88. A DRAM data bus 83 establishes a communication channel between the DRAM controller 82 and the remaining functional blocks, and similarly, a microprocessor bus 89 establishes a communication channel between the microprocessor 87 and the remaining functional blocks. Here, DRAM is an important shared resource in the encoding system, creating a concern to system design as abnormal output can be generated if DRAM bandwidth is overtaxed. The DV encoder 7 alleviates DRAM bandwidth insufficiency since one or more encoding stages of the multi-stage encoding process can be skipped under some specific conditions. In mode 0, the status of the DRAM controller 82 is monitored by or reported to the microprocessor 87, and if the bandwidth of the DRAM 81 is compromised, the microprocessor 87 issues a command to skip encoding stages of the DV encoder 7. There may be a physical link 821 between the DRAM controller 82 and the DV encoder 7 to further reduce the load of the microprocessor 87. In this way, the DRAM controller 82 directly notifies the DV encoder 7 of DRAM bandwidth status via the link 821, enabling the DV encoder to alter the pass encoding combination according to the reported status. The microprocessor 87 can also instruct the DV encoder 7 to skip the remaining encoding stage(s) if it detects that an external device on the 1394 port is fast forwarding or fast rewinding the DV data.

Figure 9:
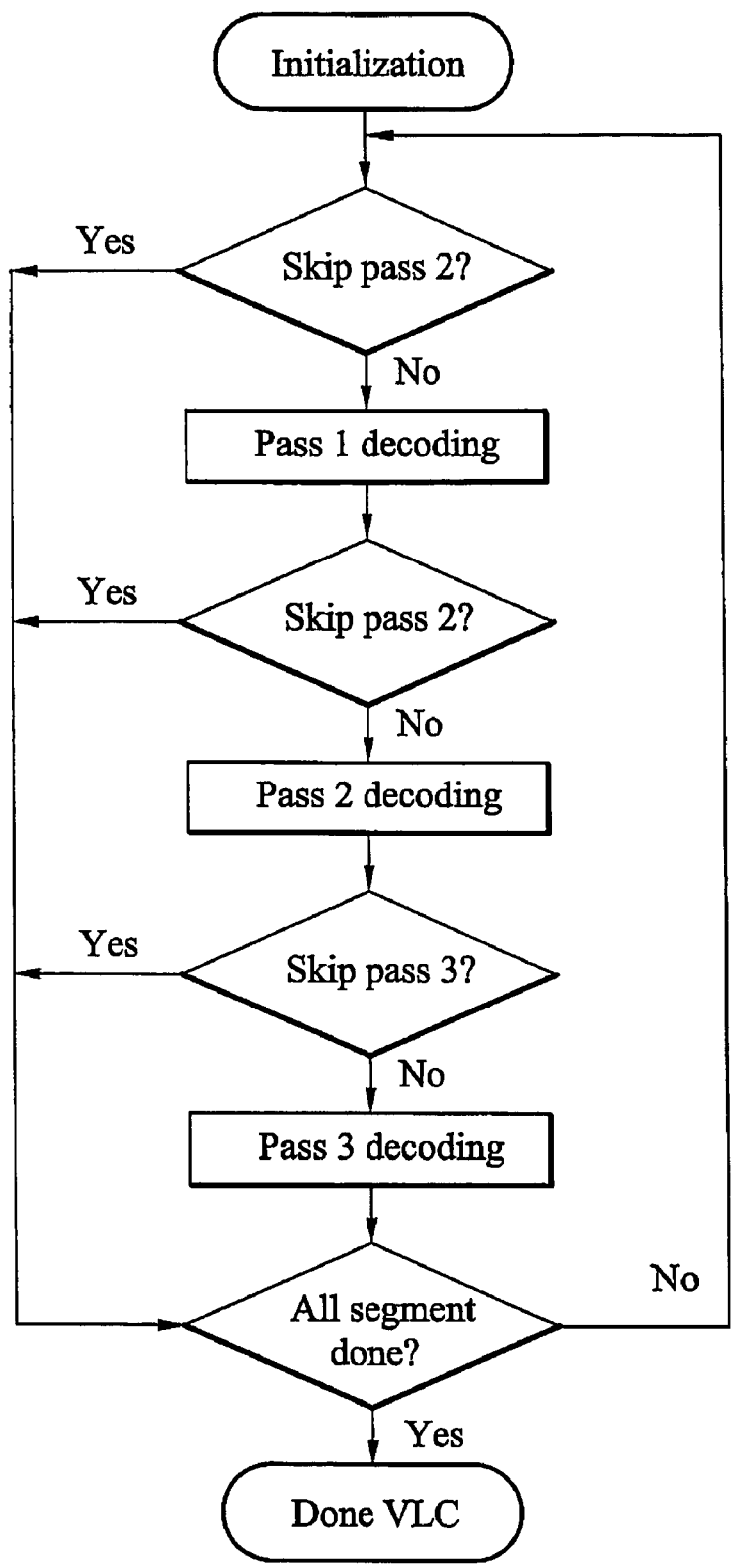
FIG. 9 is a flowchart illustrating VLD decoding according to an embodiment of the invention.

A DV decoder based on the same technical features disclosed in the DV encoder 7 is also provided. FIG. 9 is a flowchart illustrating an embodiment of a VLD procedure executed in the DV decoder. During the VLD process, the header of each video segment is first decoded, and subsequently, the remaining data is subjected to pass 1, pass 2 and pass 3 decoding. The image of the video segment is still recognizable if pass 1 to pass 3 decoding stages are omitted, however, the image becomes clearer and more detailed after performing more decoding stages. Similar to the encoding process shown in FIG. 9, the remaining pass decoding stage(s) is skipped if the DV decoder receives a skip command.

Figure 4:
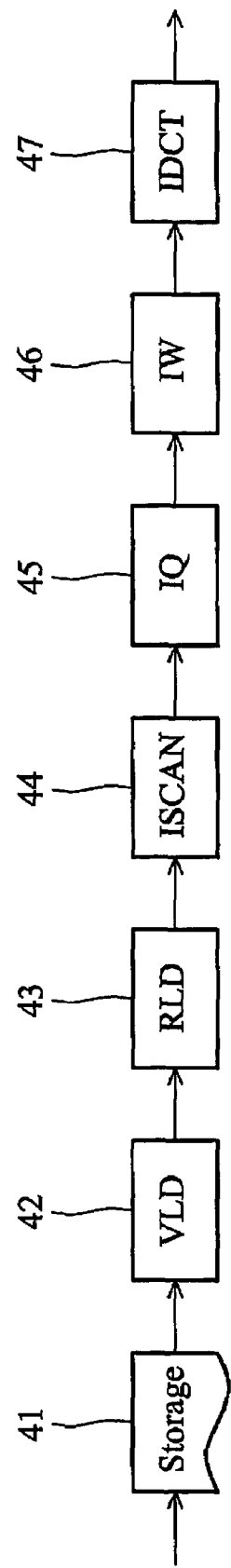
FIG. 4 is a block diagram illustrating a DV decoder.
Figure 10:
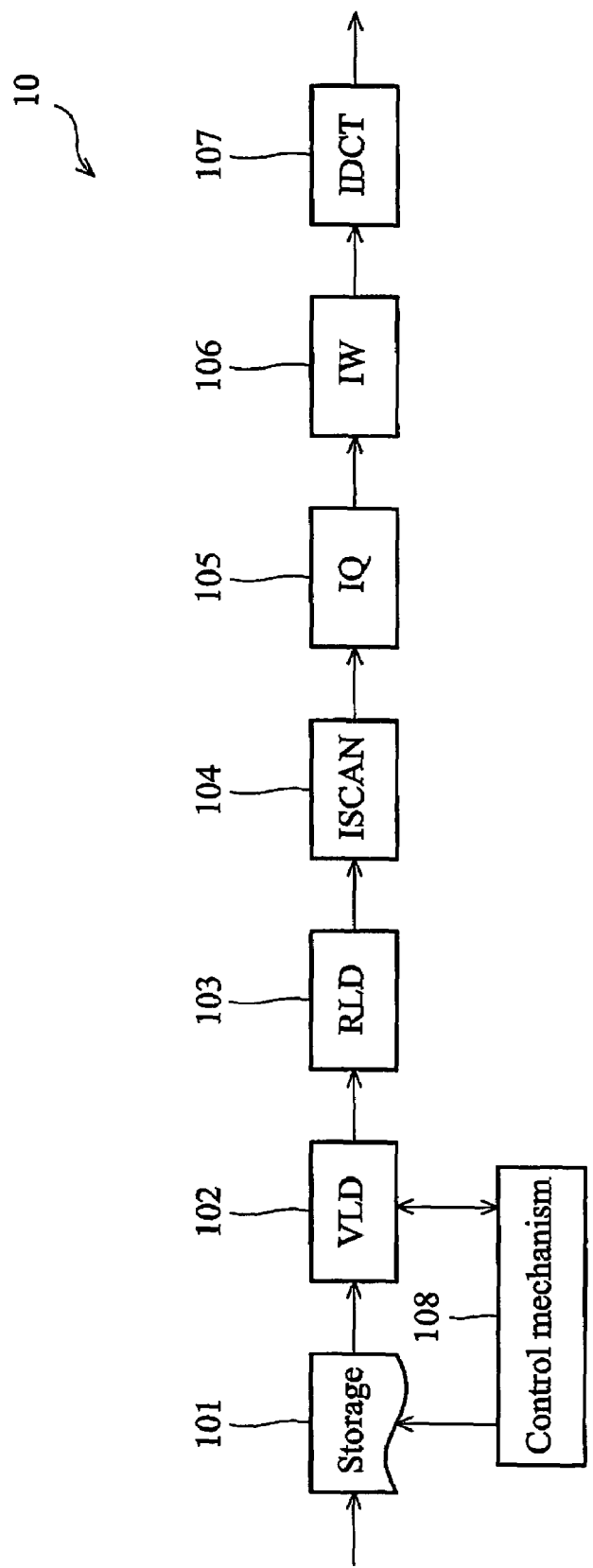
FIG. 10 is a block diagram illustrating an exemplary DV decoder according to an embodiment of the invention.

FIG. 10 is a block diagram illustrating the proposed DV decoder 10. The elements 101~107 of the DV decoder 10 may be identical to the elements 41~47 in FIG. 4. An additional control mechanism 108 notifies the VLD device 102 to skip the remaining decoding stage when it receives system information indicating particular circumstances, for example, if system resources are overtaxed, DV data is fast forwarding or fast rewinding, or if DV data is retrieved from or will be sent to an error prone environment.

Figure 11:
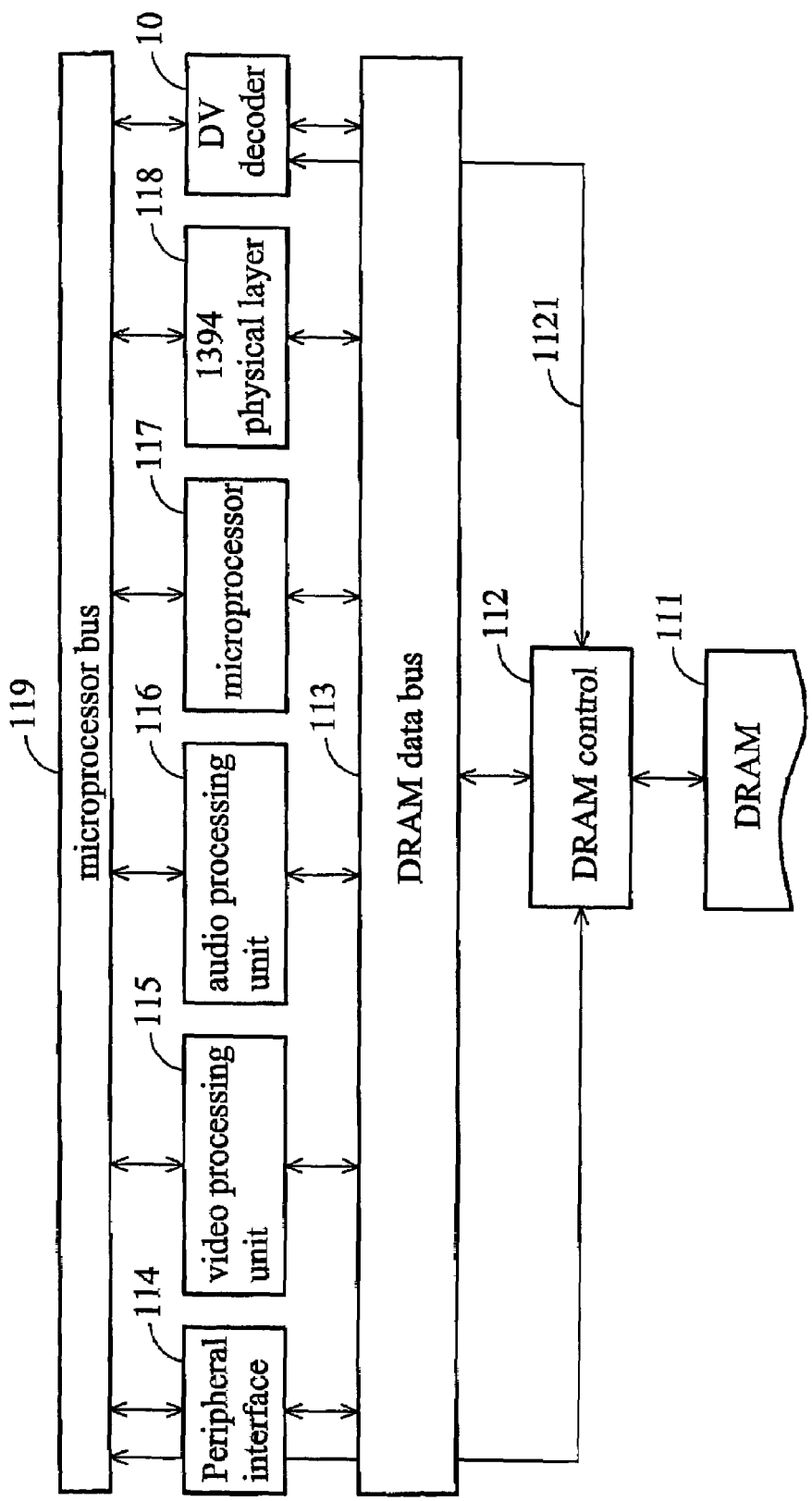
FIG. 11 depicts a DV decoding system according to an embodiment of the invention.

FIG. 11 depicts a DV decoding system including the exemplary DV decoder 10. The DV decoding system can be identical to the DV encoder system shown in FIG. 8, which comprises a DRAM 111, a DRAM controller 112, a peripheral interface 114, a video processing unit 115, an audio processing unit 116, a microprocessor 117, and a 1394 physical layer 118. A DRAM data bus 113 establishes a communication channel between the DRAM controller 112 and the remaining functional blocks, and a microprocessor bus 119 establishes a communication channel between the microprocessor 117 and the remaining functional blocks. If DRAM bandwidth is overtaxed, the decoding system may apply one of the two modes to skip one or more decoding stages executed by the DV decoder 10. In mode 0, the microprocessor 117 monitors the status of the DRAM controller 112, which issues a skip command when DRAM bandwidth is compromised. In mode 1, the DRAM controller 112 informs the DV decoder 10 of the DRAM bandwidth insufficiency via a physical link 1121. If an external device connected to a 1394 port is fast forwarding or fast rewinding the DV data, the DV decoder 10 receives a skip command from the microprocessor 117. In the embodiment of FIG. 11, the 1394 physical layer 118 informs the microprocessor 117 the external device is in fast forward or fast rewind. The DV decoder 13 may also receive a skip command when the system detects DV data from an error-prone environment.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An encoding method for digital video (DV) data, comprising:
    acquiring the DV data for execution of a multi-stage encoding process;
    skipping a next pass encoding stage when receiving a skip command; and
    monitoring status of a shared resource by a microprocessor, wherein the skip command is issued from the microprocessor when the shared resource is occupied beyond a predetermined limit.

2. The encoding method according to claim 1, wherein the multi-stage encoding process is a 3-stage variable length coding (VLC) process comprising a pass 1 encoding stage, a pass 2 encoding stage, and a pass 3 encoding stage.

3. The encoding method according to claim 1, further comprising skipping remaining encoding stages in the multi-stage VLC process when receiving the skip command.

4. The encoding method according to claim 1, wherein the shared resource comprises dynamic random access memory (DRAM) bandwidth.

5. The encoding method according to claim 4, wherein the skip command is issued from a DRAM controller via a physical link.

6. The encoding method according to claim 5, wherein the skip command is issued when the DRAM bandwidth is occupied beyond the predetermined limit.

7. The encoding method according to claim 1, wherein the skip command is issued upon detection of a fast forward or fast rewind operation.

8. The encoding method according to claim 1, wherein the skip command is issued upon detection of an error-prone environment.

9. The encoding method according to claim 8, wherein the DV data is encoded into Internet streaming, and the skip command is issued when a channel error rate exceeds a predetermined value.

10. An encoding system for digital video (DV) data, comprising:
   a buffer, temporarily storing the data required for DV encoding;
   a variable length coding (VLC) device, acquiring the DV data from the buffer for execution of a multi-stage encoding process; and
   a control mechanism, driving the VLC device to skip a next pass encoding stage and commanding the buffer to provide a subsequent video segment to the VLC device when receiving a skip command.

11. The encoding system according to claim 10, wherein the multi-stage encoding process executed by the VLC device is a 3-stage encoding process comprising a pass 1 encoding stage, a pass 2 encoding stage, and a pass 3 encoding stage.

12. The encoding system according to claim 10, wherein the control mechanism skips the remaining encoding stages in the multi-stage encoding process when receiving the skip command.

13. The encoding system according to claim 10, further comprising a microprocessor issuing the skip command to the control mechanism.

14. The encoding system according to claim 13, further comprising a shared device, wherein the microprocessor monitors a status of the shared device and issues the skip command when the shared device is occupied beyond a predetermined limit.

15. The encoding system according to claim 14, wherein the shared device comprises a DRAM and a DRAM controller, and the microprocessor issues the skip command when the DRAM controller detects the DRAM bandwidth is occupied beyond the predetermined limit.

16. The encoding system according to claim 10, further comprising a shared device, wherein the skip command is issued by the shared device via a physical link.

17. The encoding system according to claim 16, wherein the shared device issues a skip command when the resource of the shared device is occupied beyond a predetermined limit.

18. The encoding system according to claim 17, wherein the shared device comprises a DRAM and a DRAM controller, and the DRAM controller issues a skip command when detecting the DRAM bandwidth is occupied beyond the predetermined limit.

19. The encoding system according to claim 10, wherein the skip command is issued upon detection of a fast forward or fast rewind operation.

20. The encoding system according to claim 10, wherein the skip command is issued upon detection of an error-prone environment.

21. The encoding system according to claim 20, wherein the DV data is encoded into Internet streaming, and the skip command is issued when a channel error rate exceeds a predetermined value.

22. The encoding system according to claim 10, further comprising:
   a transformation device, analyzing the DV data using a discrete cosine transformation (DCT) algorithm;
   a quantization device, weighting and quantizing the output of the transformation device;
   a scan device, scanning the output of the quantization device; and
   a run-length coding (RLC) device, performing RLC encoding for the output of the scan device, and providing the RLC encoded data to the VLC device.

23. A decoding method for digital video (DV) data, comprising:
   acquiring the DV data for execution of a multi-stage decoding process;
   skipping a next pass decoding stage when receiving a skip command; and
   monitoring status of a shared resource by a microprocessor, wherein the skip command is issued from the microprocessor when the shared resource is occupied beyond a predetermined limit.

24. The decoding method according to claim 23, wherein the multi-stage decoding process is a 3-stage variable length coding (VLC) process comprising a pass 1 decoding stage, a pass 2 decoding stage, and a pass 3 decoding stage.

25. The decoding method according to claim 23, further comprising skipping the remaining decoding stages in the multi-stage VLC process when receiving the skip command.

26. The decoding method according to claim 23, wherein the shared resource comprises dynamic random access memory (DRAM) bandwidth.

27. The decoding method according to claim 26, wherein the skip command is issued from a DRAM controller via a physical link.

28. The decoding method according to claim 27, wherein the skip command is issued when the DRAM bandwidth is occupied beyond the predetermined limit.

29. The decoding method according to claim 23, wherein the skip command is issued upon detection of a fast forward or fast rewind operation.

30. The decoding method according to claim 23, wherein the skip command is issued upon detection of an error-prone environment.

31. The decoding method according to claim 30, wherein the DV data is transmitted by Internet streaming, and the skip command is issued when a channel error rate exceeds a predetermined value.

32. A decoding system for digital video (DV) data, comprising:
   a storage means, storing the data required for DV decoding;

a variable length decoding (VLD) device, acquiring the DV data from the storage means for execution of a multi-stage decoding process; and a control mechanism, driving the VLD device to skip a next pass decoding stage and commanding the storage means to provide a subsequent video segment to the VLD device when receiving a skip command.

33. The decoding system according to claim 32, wherein the multi-stage decoding process executed by the VLD device is a 3-stage decoding process comprising a pass 1 decoding stage, a pass 2 decoding stage, and a pass 3 decoding stage.

34. The decoding system according to claim 32, wherein the control mechanism skips the remaining decoding stages in the multi-stage decoding process when receiving the skip command.

35. The decoding system according to claim 32, further comprising a microprocessor issuing the skip command to the control mechanism of the DV decoder.

36. The decoding system according to claim 35, further comprising a shared device, wherein the microprocessor monitors a status of the shared device and issues the skip command if the shared device is occupied beyond a predetermined limit.

37. The decoding system according to claim 36, wherein the shared device comprises a DRAM and a DRAM controller, and the microprocessor issues the skip command if the DRAM controller detects the DRAM bandwidth is occupied beyond the predetermined limit.

38. The decoding system according to claim 32, further comprising a shared device, wherein the skip command is issued by the shared device via a physical link.

39. The decoding system according to claim 38, wherein the shared device issues the skip command when the resource of the shared device is occupied beyond a predetermined limit.

40. The decoding system according to claim 39, wherein the shared device comprises a DRAM and a DRAM controller, and the DRAM controller issues the skip command if detecting the DRAM bandwidth is occupied beyond the predetermined limit.

41. The decoding system according to claim 32, wherein the skip command is issued upon detection of a fast forward or fast rewind operation.

42. The decoding system according to claim 32, wherein the skip command is issued upon detection of an error-prone environment.

43. The decoding system according to claim 42, wherein the DV data is transmitted by Internet streaming, and the skip command is issued when a channel error rate exceeds a predetermined value.

44. The decoding system according to claim 32, further comprising:

a run-length decoding (RLD) device, performing RLD decoding for the output of the VLD device;

an inverse scan device, inverse scanning the output of the RLD device;

an inverse quantization device, inversely quantizing and inversely weighting the output of the inverse scan device; and an inverse transforming device, analyzing the output of the inverse quantization device using a inverse DCT algorithm.

* * * * *